United States Patent
Sternberg et al.

(10) Patent No.: US 6,639,157 B2
(45) Date of Patent: Oct. 28, 2003

(54) PORTABLE ATTACHABLE WEIGHING SYSTEM

(76) Inventors: Louis E. Sternberg, 1403 - 145th Pl. SE., Mill Creek, WA (US) 98012; Virginia Sternberg, 1403 - 145th Pl. SE., Mill Creek, WA (US) 98012

( * ) Notice: Subject to any disclaimer, the term of this patent is extended or adjusted under 35 U.S.C. 154(b) by 207 days.

(21) Appl. No.: 09/934,740

(22) Filed: Aug. 22, 2001

(65) Prior Publication Data

US 2002/0023785 A1 Feb. 28, 2002

Related U.S. Application Data

(60) Provisional application No. 60/227,155, filed on Aug. 22, 2000.

(51) Int. Cl.$^7$ ................................................ G01G 19/52
(52) U.S. Cl. ...................................................... 177/144
(58) Field of Search ......................................... 177/144

(56) References Cited

U.S. PATENT DOCUMENTS

| | | | |
|---|---|---|---|
| 3,722,611 A | 3/1973 | Tirkkonen | 177/144 |
| 3,795,284 A | 3/1974 | Mracek et al. | 177/144 |
| 3,876,018 A | 4/1975 | Mracek et al. | 177/132 |
| 3,961,675 A | 6/1976 | Siegel | 177/126 |
| 4,033,420 A | 7/1977 | De Masters | 177/126 |
| 4,281,730 A | 8/1981 | Swersey et al. | 177/144 |
| 4,487,276 A | 12/1984 | Swersey et al. | 177/1 |
| 4,807,558 A | 2/1989 | Swersey | 177/145 |
| 4,926,951 A | 5/1990 | Carruth et al. | 177/144 |
| 4,934,468 A | 6/1990 | Koerber, Sr. et al. | 177/144 |
| 5,086,856 A | * 2/1992 | Haggstrom | 177/144 |
| 5,173,977 A | 12/1992 | Carruth et al. | 5/600 |
| 5,279,010 A | 1/1994 | Ferrand et al. | 5/600 |
| 5,393,935 A | 2/1995 | Hasty et al. | 177/45 |
| 5,612,515 A | 3/1997 | Eisen | 177/126 |
| 5,802,640 A | 9/1998 | Ferrand et al. | 5/617 |
| 5,823,278 A | * 10/1998 | Geringer | 177/144 |
| 5,831,221 A | 11/1998 | Geringer et al. | 177/144 |
| 5,861,582 A | 1/1999 | Flanagan et al. | 177/144 |
| 5,906,016 A | 5/1999 | Ferrand et al. | 5/600 |
| 5,990,423 A | 11/1999 | Ashpes et al. | 177/140 |
| 6,093,895 A | * 7/2000 | Niosi | 177/144 |

* cited by examiner

*Primary Examiner*—Randy Gibson
(74) *Attorney, Agent, or Firm*—David L. Garrison; Garrison & Assoc. PS

(57) ABSTRACT

A detachable weighing system for a bed comprising a plurality of weigh modules removably mounted upon legs or support members of a bed, a control unit, and a conduit for transmitting signals to and from the weigh modules, and control unit. The weigh module may be positioned directly below the lower end of the bed leg, resting on the floor. A unique structure is described which transmits vertical directed forces while minimizing off center of side directed forces so that an accurate weight is obtained.

11 Claims, 3 Drawing Sheets

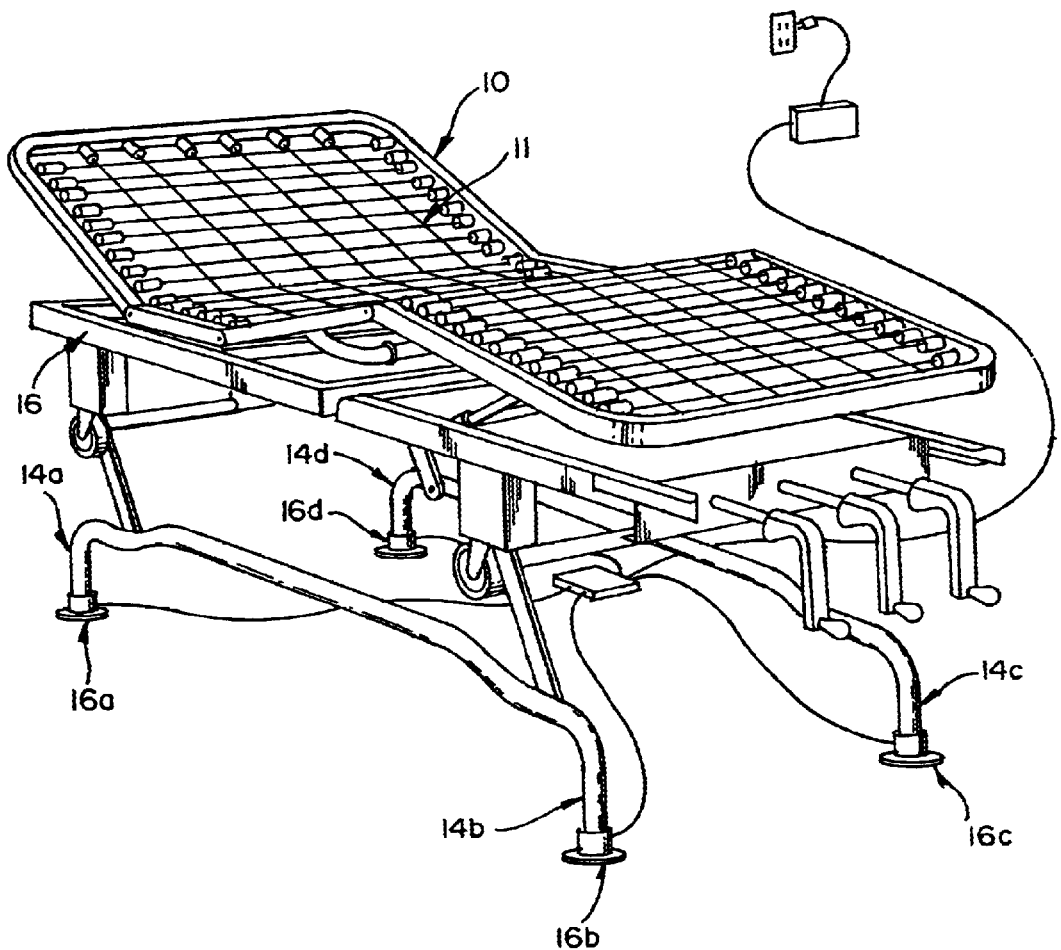

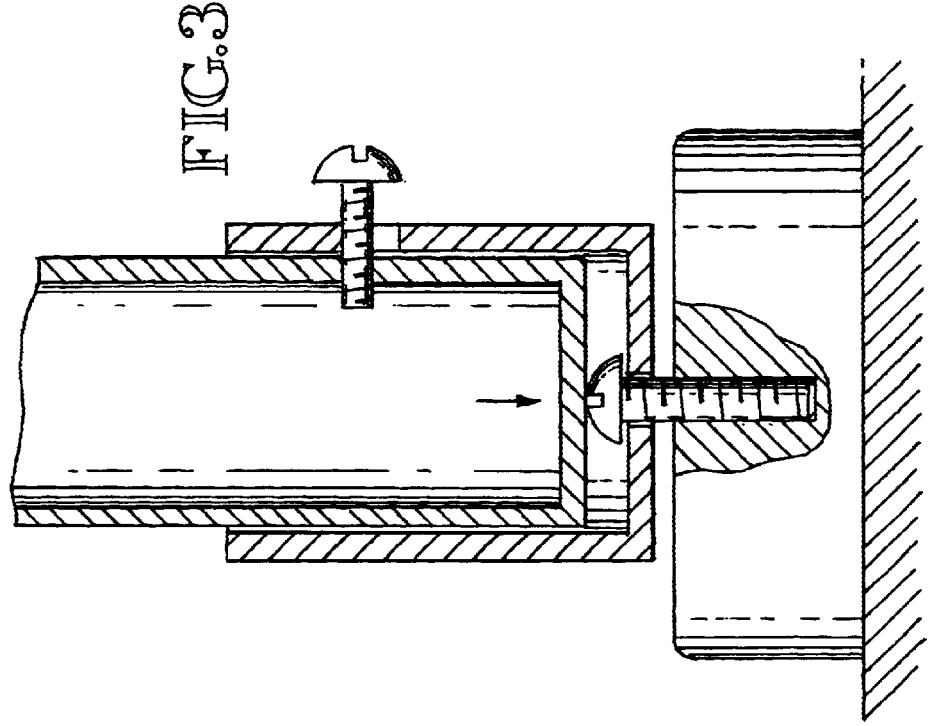
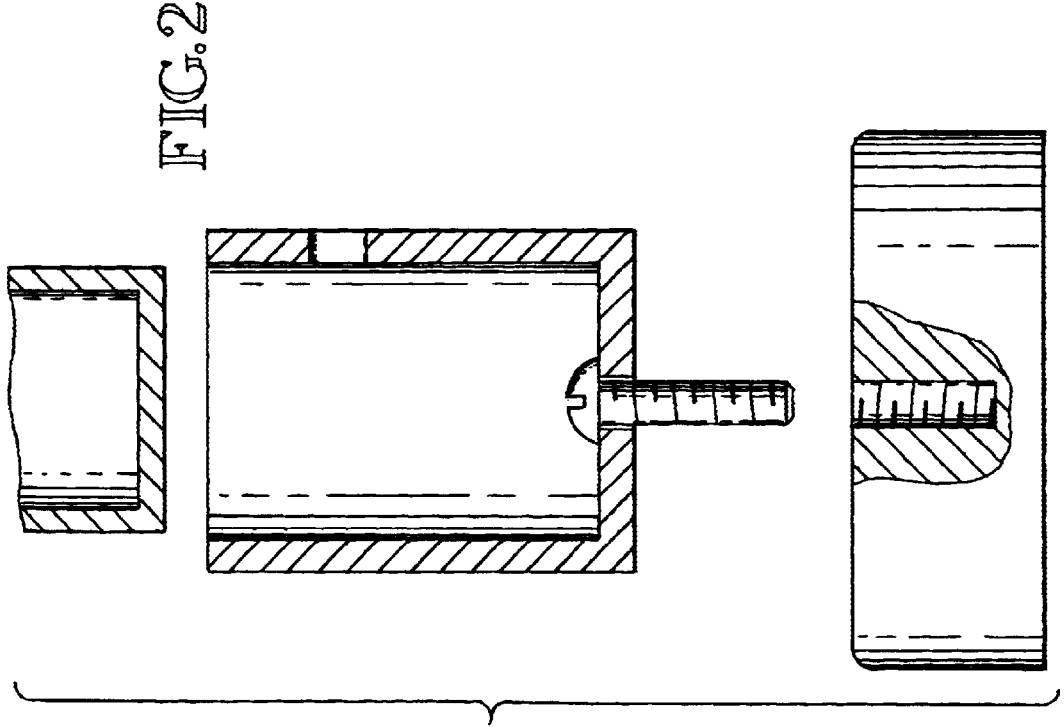

PORTABLE ATTACHABLE WEIGHING SYSTEM

CROSS-REFERENCE TO RELATED APPLICATION

This application claims the benefit of U.S. Provisional Application Ser. No. 60/227,155, entitled Portable Attachable Weighing System, filed Aug. 22, 2000.

FIELD OF THE INVENTION

This invention relates to a weighing system that can be permanently or temporarily attached to an object such as a bed, chair, chaise lounge, sofa or the like. The weighing system has improved accuracy by reducing non-centered and side directed force components and may be used to determine the weight of patients in a plurality of types of hospital beds, chairs, or for home use.

BACKGROUND OF THE INVENTION

It is frequently desirable to accurately monitor the weight of a patient confined to a bed, chair, etc., whether in a hospital, at home, or in other treatment settings, and to observe changes in weight to monitor the health of the patient and ensure that proper dosages of medication are administered. It is difficult, however, to weigh seriously ill patients or persons with limited mobility by removing them from the bed on a regular basis. Critically ill patients, in particular, may require frequent weighing, with their severe physical condition preventing their removal from bed.

Beds incorporating weighing systems, such that the patient need not be removed from the bed to be weighed, have been disclosed, for example, in Reichow et al., U.S. Pat. No. 5,269,388, Geringer U.S. Pat. No. 5,823,278 and Carruth et al., U.S. Pat. No. 4,926,951. The system disclosed in Reichow et al. utilizes load cells which are rigidly mounted along the sides of the bed frame. The Carruth system utilizes a separate weigh frame mounted to the bed frame. These systems are generally an integral part of the bed, and must be incorporated into the bed when it is manufactured. Beds incorporating these weighing systems are generally more expensive than ordinary beds without a weighing system, are typically permanently attached, and are also heavier, making it more difficult to move such beds. Geringer similarly requires the use of a set of four load cells, one secured upon each bed leg in which the weight of the patient must be determined. The secure attachment described in Geringer makes no provision for minimizing off center or non-vertical, side directed forces which interfere with the accuracy of the load cell weight determination. In Geringer, the caster mounted weighing system may also be used to address a number of other types of weighing applications, in addition to bed weighing systems.

It is, therefore, an object of this invention to provide a relatively inexpensive, accurate portable weighing system which may be used with any of a plurality of beds, chairs, platforms, etc. in a hospital, nursing home, residence or other care facility in which the weigh system is not permanently installed on one of the beds, but may be used to establish the weight of the occupant of any bed or other support structure selected.

It is also an object of this invention to provide a relatively inexpensive, accurate weighing system which may be removably and temporarily installed on a various objects for the purpose of weighing the object or its contents which minimize or eliminate off center or non-vertical force components which interfere with the accuracy of the load cell weight determination.

In scales generally, it is conventional to mount a weigh frame above a base and rigidly connect load cells between the weigh frame and the base. A subject to be weighed is placed on the weigh frame, the stressing of the load cells, through the application of the weight, causes the load cells to generate an electrical signal proportional to the weight applied to the load cells. The loads measured by respective load cells are summed to provide the measure of the weight of the subject on the scale.

The rigid or substantially rigid connection between the base and the weigh frame is usually satisfactory where the base is fixed with respect to ground. But where the scale is to be moved from place to place on a regular basis, or where the load is applied in diverse directions or attitudes, thereby introducing force vectors that are not parallel to the force of gravity, the rigid mounting of the weigh frame with respect to the base frame will introduce errors. Any twist of the weigh frame with respect to the base frame will cause binding at the load cell. The frictional force of the binding will be seen as weight that is either added to or subtracted from the true weight, but in any event, will introduce error.

A hospital bed having provision for weighing a patient is an example of the type of weight determination environment that causes error. This is particularly true in relation to special critical care-type beds that are leased for limited periods, returned, and leased again for use at another site. The frequent movement of the bed from one site to another compounds the problems referred to above for permanently mounted weighing mechanisms. A ground support that is not precisely perpendicular to the force of gravity may introduce a twist of the bed frame causing error. Similarly, non-vertical off center or side directed force components may introduce error in the securely and rigidly coupled weighing systems of the prior art. The position of the patient may change the vector of the load on the load cell. Any change from a strictly vertical application of the load, that is, parallel to the force of gravity, may introduce unwanted and unacceptable error in the weights being determined.

Additionally, it is undesirable to have the weigh system for hospital beds permanently attached to the bed, since it is necessary in such systems to have a complete system for each bed. In facilities having many beds, the cost of separate weigh facilities for each bed is substantial. Particularly in nursing home and extended care facilities it is frequently not necessary to check a patient's weight every day, and having a portable system which may easily be used on various beds in the care facility at various times would be a substantial cost savings. In many installations, a single set of weighing devices may suffice for the entire facility.

BRIEF SUMMARY OF THE INVENTION

It is an objective of the present invention to provide a load c(ell weighing system, particularly useful in the accurate and reproducible measurement of weight of the occupant of hospital or nursing home beds, that may be conveniently and removably attached to and used with a plurality of such beds. Weighing error is held to a minimum notwithstanding the surface on which the bed is mounted or the deviation from horizontal of the attitude of the patient on the bed by the use of individual weight measuring load cells individually attachable and removable from each leg of a hospital bed. The electronic output of the four load cells is conducted into a central computing station where the total weight measured by the four load cells is determined. The information from each of the individual load cells may conveniently be conducted to the bedside monitor or to a central nurse's station for review and recording.

The objective of the present invention is attained by removably connecting four load cells, one upon each leg or frame engaging support of the hospital bed. Each load cell is connected to its respective leg or frame support and the mechanism activated to transmit the weight carried by the respective leg or support through a load cell. The weight measuring load cell structure is configured so that the weight carried by a leg of the bed is transmitted vertically downwardly through the load cell to provide an accurate weight readout for that leg. The sum of the four load cells indicates the total weight of the bed and its occupant. The tare weight of the bed without the occupant can readily be measured while the occupant is absent and the patient's true weight determined by subtracting the tare weight from the total weight. The subtraction may be done conveniently and automatically by the push of a button at the bedside panel or at the nurse's station.

A preferred embodiment of this invention includes a cup adapted to receive the bed leg or support while permitting limited vertical movement therebetween. The load cell is positioned directly below and attached to the cup with a multipurpose fastener, again with limited vertical movement permitted between the cup and the load cell. The arrangement is such that the bed leg or support may move downwardly into contact with the exposed head of the multipurpose fastener without having the cup engage the load cell upper surface. In this manner vertical weight components are directed vertically into the load cell and extraneous off-center and side directed loads avoided. An alternative structure utilizes the curvature of a castor wheel engaging the upper surface of the load cell so that only vertically-directed weight components are imposed upon the load cell. An embossment or bushing may be interposed between the load cell and the cup to issue insure that weight forces are properly transmitted into the load cell.

When the embodiment of this invention utilizing the castor wheel is used, a bed jacking mechanism may be used separately from the load cell to raise the bed to a sufficient height, usually no more than 3 to 4 inches, to permit easy insertion of the castor wheel into a retainer on the top of the load cell. Using this approach, the bed needs to be raised only a small distance in order to transfer the weight carried by the bed leg through the castor into the load cell and thereby determine the weight carried by that leg.

The weighing system of this invention advantageously includes a plurality of removably attachable weight measuring supports which may either be attached to the legs of a bed or can be designed to be placed under the frame of the bed with the legs off the support surface. The supports each have a load cell which has a horizontally disposed floor engaging base, an upper surface, a weight measuring device and a first fastener receiving aperture opening out of said upper surface. A frame engaging bed support is slidably inserted into a bed support engaging cup which has an enclosed side wall and a bottom wall. The cup has a hole or aperture through its bottom wall and a bed support fastener receiving slot in its side wall. A load cell fastener is inserted through the second fastener receiving aperture into the aperture in the load cell, which is preferably threaded, thereby coupling the load cell to the cup through its bottom wall. The fastener has a head of a diameter exceeding the fasten(r receiving aperture so that it will not pass through. The head of the fastener is exposed for engagement by the bottom weight supporting surface of the bed support. The bed support fastener is inserted into the bed support fastener slot and threaded into said bed support to permit limited vertical movement between the cup and the leg. A weight data collector such as a small computer or the like is attached to the load cell output signals to collect and display weight measurement generated by the load cells so that when the bed is supported upon the weight measuring supports, the cup does not engage the load cell and as a result, predominantly vertically directed forces are transmitted to the load cell with side directed or off center forces minimized.

BRIEF DESCRIPTION OF THE DRAWINGS

The several objectives and features of the present invention will become more readily apparent from the following detailed description taken in conjunction with the accompanying drawings in which:

FIG. 1 is a perspective view of a hospital type bed having the invention described herein positioned under each leg of the bed;

FIG. 2 is an exploded side elevational view, partly in cross section of the bed weighing mechanism of this invention;

FIG. 3 is a side elevational view partly in cross section of the apparatus of FIG. 2 shown assembled upon a leg of a bed;

DETAILED DESCRIPTION OF THE DRAWINGS

Figure 4:
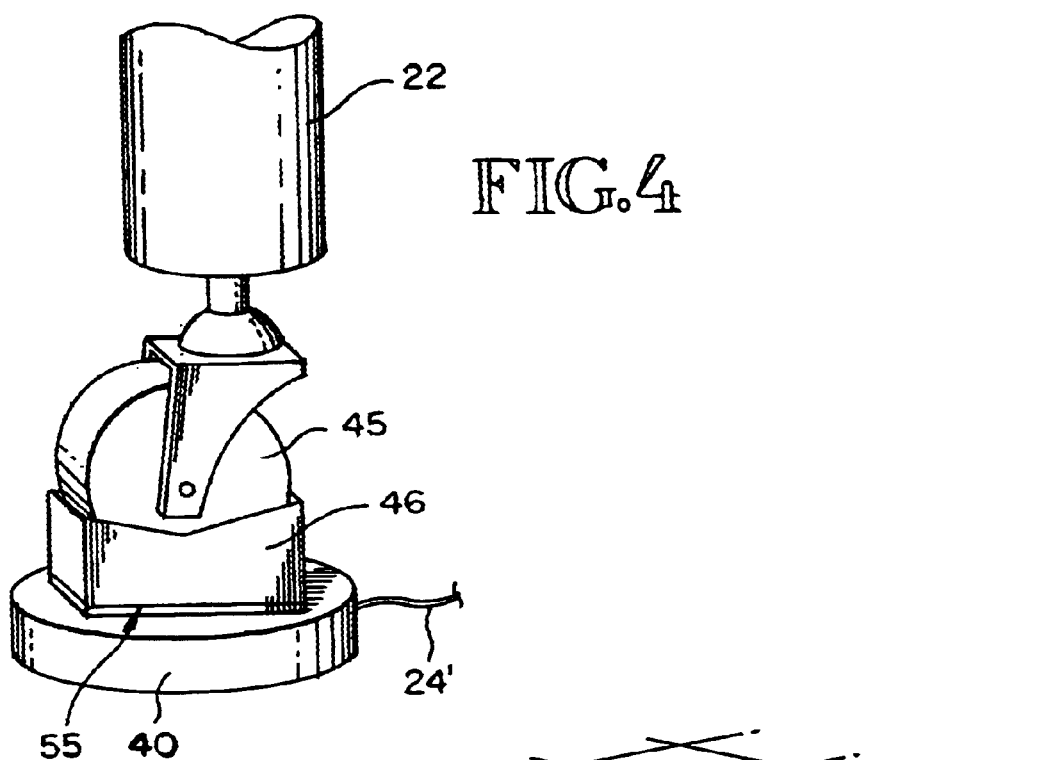
FIG. 4 is a perspective view of another embodiment of the apparatus of this invention shown utilizing a castor wheel on a bed frame to transmit vertical forces into a load cell.

Referring specifically to the drawings, wherein like numerals indicate like parts, there is shown in FIG. 1, a bed 10 having a mattress support 11 upon which a patient is supported. The bed 10 includes four legs 14a–d. All of the mechanism, including controls, manual cranks, drive motors and the like for operating the bed and manipulating the patient support panels to change the attitude of the patient, are mounted on the bed frame 16.

On each bed leg 14a–d there is positioned a load cell 16a–d which is adapted to measure the entire weight of the bed leg with which it is associated. The load cell and its mounting mechanism is configured as described below in relation to FIGS. 2 and 3. The load cell may be of well known construction, such as Entran Model ELA load cells available from Entran Devices, Inc., 10 Washington Ave., Fairfield, N.J. 07004-3877, USA or equivalent. FIGS. 2 and 3 show one embodiment of the load call apparatus in which a cup 18 is loosely secured to load cell 20 and is configured to receive bed leg 22 therein. The load cell 20 is operatively positioned beneath cup 18 so that the weight bearing surface 23 of leg 22 engages the head of fastener 23 and weight forces are transmitted vertically therethrough to the load cell 20 for measurement. As is shown in FIG. 3, fastener 26 is threaded into a sleeve 27 in load cell 20 a sufficient distance so that the outer areas of cup 18 do not engage the upper surface 28 of load cell 20, yet acts to carry the load cell 20 when cup 18 is lifted. Gap 55 insures that the periphery of cup 18 does not rest on surface 28 of the load cell. Sleeve 27 extends above the upper surface of load cell 20 a small amount as shown in FIGS. 2 and 3. Cup 18 is configured for limited axial movement along bed leg 22 when fastener 29 is positioned as shown in slot 31. The output signal from the load cell 20 is transmitted to a central computer location via conduit 24. In the event a bed leg is encountered which does not have a closed bottom wall 23, the user may either insert a disc 21 having a sufficient diameter to support the bed leg or a bushing may be placed around fastener 28 to transmit the vertical forces from cup 18 into load cell 20.

FIG. 4 shows an alternative structure without the cup 18 shown in FIGS. 2 and 3, utilizing the castor wheel 45 found on some beds. Retainer 46 serves to position castor wheel 45 upon the upper surface of load cell 40 where the curved surface of wheel 45 tends to minimize side directed and off center loads upon load cell 40. Load cell 40 is positioned as show upon a supporting floor surface. The output signal from the load cell 40 is transmitted to a central computer location via conduit 24'.

Figure 5:
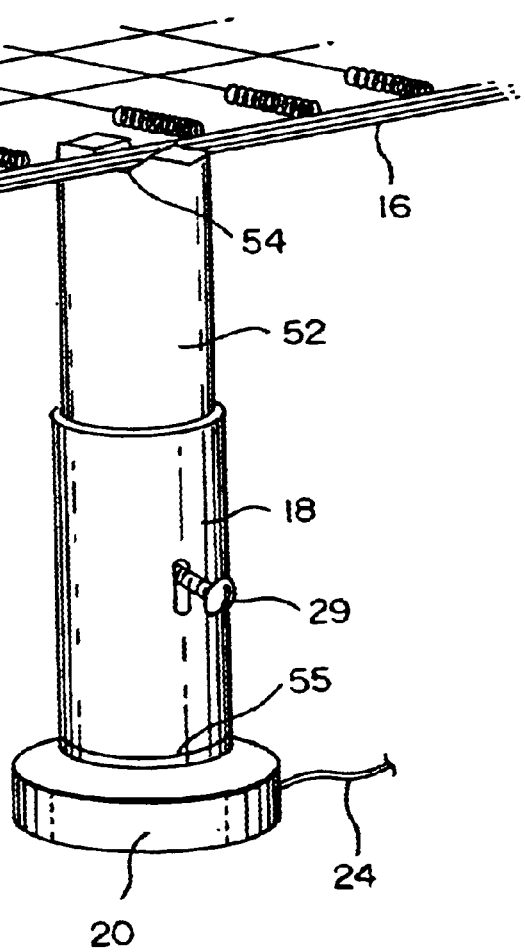
FIG. 5 is a perspective view of another embodiment of this invention utilizing a frame engaging bed support in place of the bed leg to support and weigh the bed and its contents.

FIG. 5 shows an alternative embodiment of this invention in which a bed frame engaging support 52 is shown inserted into cup 18. The bottom end of support 52 is configured much like the bottom end of bed leg 22 so that weight forces may be transmitted vertically into fastener 26 much like is depicted in FIG. 3. The upper end of support 52 is configured to securely engage the rigid structural steel frame 16 of the bed, such as by the use of groove 54.

In operation, the weighing system of this invention is attached to the bed or other platform, one load cell mechanism attached to and carrying each of the legs or corner supports of the bed or other platform. The tare weight of the bed or other platform and its contents, without the patient, is determined. The total weight with the patient present is then determined. The four load cells transmit the indication of the weight felt by each to a central control panel where the signals are analyzed and the net patient weight displayed.

Using a set of the load cells as described above facilitates the process of weighing occupants of beds with a minimum of equipment and permits each occupant to be easily and accurately weighed. The equipment is portable and can be utilized particularly in nursing homes, hospitals and in home environments.

INDUSTRIAL APPLICABILITY

This invention is applicable to the measurement of weight of occupants in beds and more particularly to obtaining accurate weights of the occupants of beds with a minimum of side directed and off center weight components.

What is claimed is:

1. A weighing system for use on beds with legs, each leg having a bottom weight supporting surface, comprising:
    a plurality of removably attachable load cells, each load cell comprising a horizontally disposed floor engaging base, an upper surface, a weight measuring device and a first fastener receiving aperture in a sleeve opening out of said upper surface;
    a bed leg cup having an enclosed side wall and a bottom wall, said cup adapted to receive a bed leg therein for limited vertical movement, said cup further having a second fastener receiving aperture in said bottom wall and a leg fastener receiving slot in said side wall;
    a load cell fastener inserted through said second fastener receiving aperture into said first fastener receiving aperture, thereby coupling said load cell to said bed leg cup through said bottom wall, said fastener having a head of a diameter exceeding said fastener receiving aperture and exposed for engagement by said bottom weight supporting surface of said leg;
    a leg fastener inserted into said leg fastener slot and threaded into said leg to permit limited vertical movement between said cup and said leg; and
    a weight data collector attached to said load cell to collect and display weight measurement generated by said load cell,
    whereby predominantly vertically directed forces are transmitted to said load cell and side directed or off center forces are minimized.

2. A weighing system according to claim 1 wherein four weigh cells are used, each cell being attached to said weight data collector.

3. A weighing system according to claim 1 wherein said load cell fastener is a threaded bolt sized to engage threads in said first fastener receiving aperture.

4. A weighing system according to claim 3 wherein said load cell fastener has a convex head.

5. A weighing system according to claim 1 wherein said load cell fastener has a length chosen so that it bottoms out when fully inserted into said first fastener receiving aperture without drawing said cup into contact with said load cell.

6. A weighing system according to claim 1 farther including a weight transmitting bushing interposed between said sleeve and said cup.

7. A weighing system for use on beds having horizontal frame elements, comprising:
    a plurality of removably attachable frame engaging weight measuring supports, said supports each having a load cell therein, each load cell comprising a horizontally disposed floor engaging base, an upper surface, a weight measuring device and a first fastener receiving aperture opening out of said upper surface;
    a frame engaging member;
    a bed support engaging cup having an enclosed side wall and a bottom wall, said cup adapted to receive a frame engaging member therein for limited vertical movement, said cup further having a second fastener receiving aperture in said bottom wall and a fastener receiving slot in said side wall;
    a load cell fastener inserted through said second fastener receiving aperture into said first fastener receiving aperture, thereby coupling said load cell to said cup through said bottom wall, said fastener having a head of a diameter exceeding said fastener receiving aperture and exposed for engagement by a bottom weight supporting surface of said bed support;
    a frame engaging member fastener inserted into said fastener slot and threaded into said frame engaging member to permit limited vertical movement between said cup and said member; and
    a weight data collector attached to said load cell to collect and display weight measurement generated by said load cell,
    whereby when said bed is supported upon said weight measuring supports, said cup does not engage said load cell and predominantly vertically directed forces are transmitted to said load cell with side directed or off center forces minimized.

8. A weighing system according to claim 7 wherein said load cell fastener is a threaded bolt sized to engage threads in said first fastener receiving aperture.

9. A weighing system according to claim 8 wherein said load cell fastener has a convex head.

10. A weighing system according to claim 7 wherein said load cell fastener has a length chosen so that it bottoms out when fully inserted into said first fastener receiving aperture without drawing said cup into contact with said load cell.

11. A weighing system according to claim 7 further including a weight transmitting bushing interposed between said sleeve and said cup.

* * * * *